(12) United States Patent
Coullery

(10) Patent No.: US 9,708,132 B2
(45) Date of Patent: Jul. 18, 2017

(54) METHOD AND DEVICE FOR CONVEYING FLAT OBJECTS

(71) Applicant: BOBST MEX SA, Mex (CH)

(72) Inventor: Gérard Coullery, Villars-le-Terroir (CH)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 14/914,323

(22) PCT Filed: Aug. 26, 2014

(86) PCT No.: PCT/EP2014/002318
§ 371 (c)(1),
(2) Date: Feb. 25, 2016

(87) PCT Pub. No.: WO2015/028138
PCT Pub. Date: Mar. 5, 2015

(65) Prior Publication Data
US 2016/0200525 A1    Jul. 14, 2016

(30) Foreign Application Priority Data
Aug. 26, 2013 (EP) ..................................... 13004196

(51) Int. Cl.
*B65G 47/244* (2006.01)
*B65G 47/31* (2006.01)

(52) U.S. Cl.
CPC ....... *B65G 47/2445* (2013.01); *B65G 47/244* (2013.01); *B65G 47/31* (2013.01)

(58) Field of Classification Search
CPC .......................... B65G 47/2445; B65G 47/244

USPC .......................................................... 198/415
See application file for complete search history.

(56) References Cited

U.S. PATENT DOCUMENTS

| | | | | |
|---|---|---|---|---|
| 4,807,739 A | * | 2/1989 | Wolf ................... | B65G 47/2445 198/415 |
| 7,293,639 B2 | * | 11/2007 | Stingel, III ........ | B65G 21/2072 198/411 |
| 7,552,815 B2 | * | 6/2009 | Pahud ................ | B65G 21/2036 198/394 |
| 7,703,597 B2 | * | 4/2010 | Jansen ............... | B65G 21/2036 198/415 |

(Continued)

FOREIGN PATENT DOCUMENTS

EP    0 881 173           12/1998
EP    1 498 370 A1        1/2005
(Continued)

OTHER PUBLICATIONS

International Search Report dated Dec. 5, 2014 issued in corresponding International patent application No. PCT/EP2014/002318.

*Primary Examiner* — Thomas Randazzo
(74) *Attorney, Agent, or Firm* — Ostrolenk Faber LLP

(57) ABSTRACT

In a method for conveying a succession of flat objects in a longitudinal direction, each object is pivoted while being conveyed at a first longitudinal displacement speed (V1) during the pivoting phase in a pivoting zone. Each flat object is conveyed at a second longitudinal displacement speed (V2) in a second zone adjacent to the pivoting zone, the second speed being different from the first speed. This sets spacing between objects in the zones before and after the pivoting zone.

15 Claims, 8 Drawing Sheets

(56) References Cited

U.S. PATENT DOCUMENTS

| | | | |
|---|---|---|---|
| 8,689,965 B2* | 4/2014 | Sjogren | B65B 35/24 |
| | | | 198/415 |
| 2007/0205082 A1 | 9/2007 | Stingel, III et al. | |
| 2012/0228085 A1* | 9/2012 | Sjogren | B65B 35/24 |
| | | | 198/415 |
| 2014/0374216 A1* | 12/2014 | Pierson | B65G 47/2445 |
| | | | 198/416 |

FOREIGN PATENT DOCUMENTS

| | | |
|---|---|---|
| WO | WO 00/51916 A2 | 9/2000 |
| WO | WO 2007/084606 A2 | 7/2007 |
| WO | WO 2011/034478 A1 | 3/2011 |
| WO | WO 2014/154333 A1 | 10/2014 |

* cited by examiner

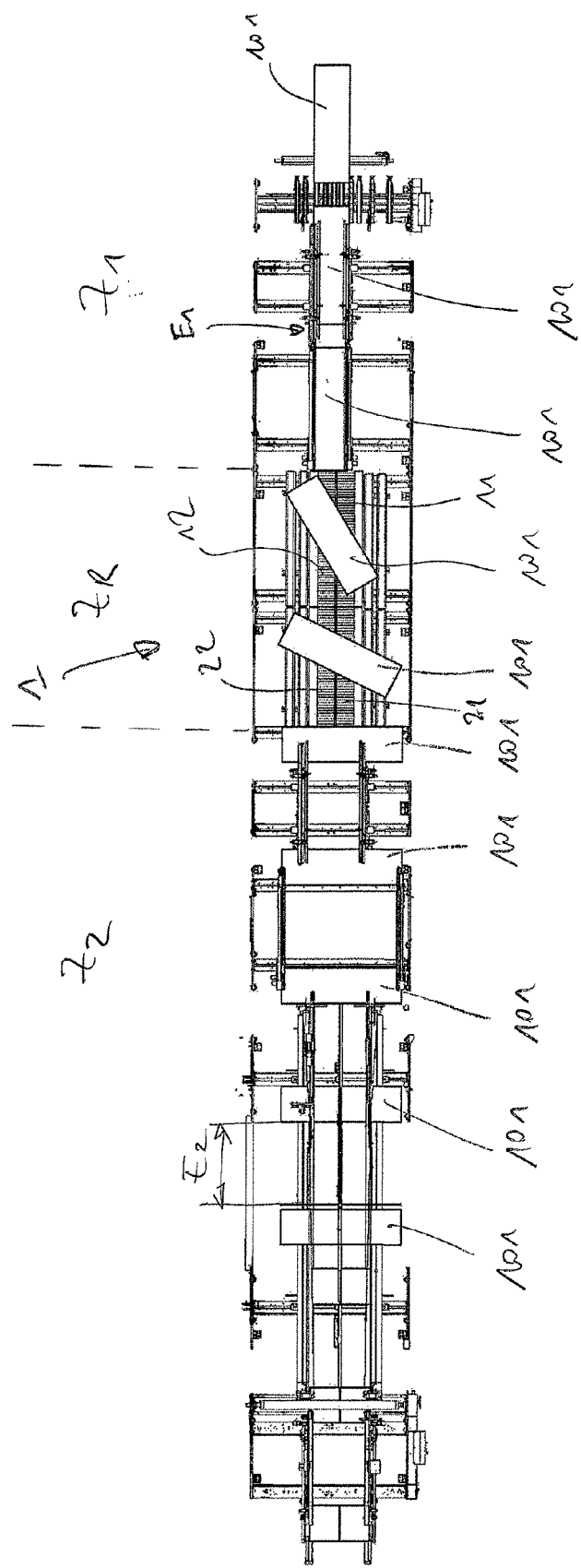

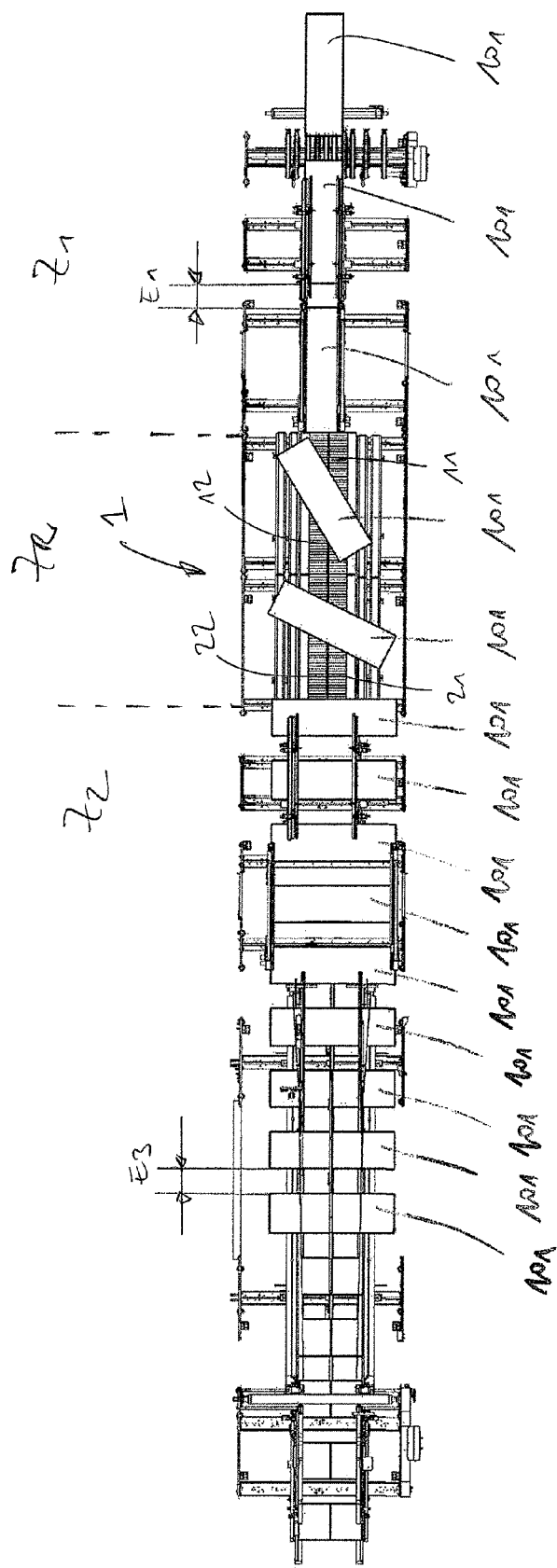

METHOD AND DEVICE FOR CONVEYING FLAT OBJECTS

CROSS-REFERENCE TO RELATED APPLICATIONS

The present application is a 35 U.S.C. §§371 national phase conversion of PCT/EP2014/002318, filed Aug. 26, 2014, which claims priority of European Patent Application No. 13004196.5, filed Aug. 26, 2013, the contents of which are incorporated by reference herein. The PCT International Application was published in the French language.

The present invention concerns a method and a device allowing the conveying of flat objects and the pivoting of the objects about themselves while being conveyed successively in a given direction.

TECHNICAL BACKGROUND

In the packaging industry, the production of boxes, e.g. of corrugated cardboard, is traditionally performed in line by folding and gluing blanks, using a machine commonly known as a folder-gluer. Such a processing machine normally takes the form of a succession of modules containing the different functional appliances which are responsible for performing the multiple elementary operations necessary for production of the boxes. Each module has its own blank conveying system, namely roller or belt conveyors, but the assembly is arranged such that conveying globally takes place continuously over the entire length of the folder-gluer.

The production of complex boxes requires folding and gluing operations on the four sides of the blanks. In order for these operations to be performed in a single passage through the folder-gluer, it has proved essential to modify the orientation of the blanks during the box production process. For this reason, pivoting devices have been developed which are intended to be integrated within the folder-gluers and are able to turn flatly all blanks passing through during conveying.

STATE OF THE ART

Of the pivoting devices known from the prior art, some use two conveyors placed side by side, parallel to the conveying direction of the blanks. Positioned in this way, these conveyors are able to jointly support each blank during its conveying. Since they are also driven at different speeds, the conveyors naturally tend to translate each blank by causing it to rotate about itself. The assembly is generally arranged such that the flat pivoting takes place over 90°.

This type of pivoting device however has the drawback of being primarily suited to compact cardboard, i.e. to small and medium-sized blanks. Its efficiency is in fact significantly reduced when the blanks are of large dimensions, as is often the case with corrugated cardboard. This is because, with a blank in which at least one of the dimensions is significantly greater than the width of the pivoting device, as the pivoting progresses, certain end portions of the blank inevitably overhang the two mutually adjacent conveyors on both sides. The latter are then forced to generate the pivoting by acting only on the most central portion of the blank; the end portions then merely follow the movement. In practice, overcoming such an inertia with such weak lever arms has proved particularly difficult. Furthermore, significant slippage soon occurs at the central portion of the blank. The result of all these phenomena is that it then becomes almost impossible to control the pivoting with precision and consequently to guarantee the final position of the blank.

Application EP 0 881 173 shows an example of a machine allowing a change in orientation of such articles.

Application WO 2014/154333 shows another example of a system for transporting flat objects with a device for pivoting the objects. The concept of this prior application is to propose conveyors which are arranged parallel to each other in order to transport each flat object while jointly supporting it, and which are able to be driven at different speeds in order to cause each object to be flatly pivoted during its transport; this pivoting device avoids the problems of the prior art while being perfectly adapted to flat objects of large dimensions, in particular those made of corrugated cardboard, while remaining fully usable for objects of standard or even reduced size which are also made of compact cardboard. The solution to the technical problem posed in this prior application is characterized in that each conveyor is mounted individually adjustable in its transverse position.

In the context of such machines for conveying flat objects as described above, when these objects undergo a pivoting through 90° during processing in the machine, there is often a loss of productivity of the machine linked to the fact that the spacing between objects is modified by the pivoting operation.

Typically, blanks of rectangular form—i.e. with one side, known as the longitudinal side, larger than the other side, known as the transverse side—are introduced into the processing machine in their length direction, i.e. the longitudinal side of the blank is parallel to the direction of movement, and the transverse side ("width direction") is perpendicular to the direction of movement of the blank.

After the blank has been pivoted through 90°, as explained above, it is then in a new position in which the width direction is parallel to the direction of movement and the length direction is perpendicular to the direction of movement of the blank.

In view of the rectangular form of the blank and its position at the inlet to the machine, and the position of the center of rotation C of the blank during pivoting, the spacing between successive blanks will necessarily increase between "before pivoting" and "after pivoting", and this increase in spacing between successive blanks then leads to a loss of productivity of the machine since the dead space between successive blanks increases.

This increase in spacing and hence loss of productivity is all the greater if there is a great difference in dimensions between the transverse side and the longitudinal side of the blank.

SUMMARY OF THE INVENTION

Consequently, one of the aims of the present invention is to improve the operation of such machines for production of boxes from blanks, and in particular to reduce productivity losses.

This aim is achieved in particular by the method and the device according to the invention, according to which the longitudinal conveying speed of the blanks differs between the pivoting zone, in which the blanks undergo a pivoting through 90°, and in the following zone of the machine.

This speed difference thus allows a reduction (or increase) in the spacing between successive blanks to take into account the change in position of the blanks as a result of their pivoting through 90°.

In fact, if the effect of the pivoting is that successive blanks change from a longitudinal position in the conveying direction to a transverse position, the spacing between blanks should be reduced after pivoting, and hence the conveying speed in the following zone of the machine will be lower than that which prevails in the pivoting zone.

Conversely, if the effect of the pivoting is that successive blanks change from a transverse position in the conveying direction to a longitudinal position, the spacing between blanks should be increased in the pivoting zone, and hence the conveying speed in the pivoting zone will be greater than that which prevails in the zone preceding the pivoting zone. This operation is particularly critical and necessary if the spacing between successive blanks is insufficient to allow the conveying of successive blanks one behind the other in a longitudinal position in the conveying direction without overlapping after pivoting.

It is understood that throughout the present application, the concept of a flat object extends to any flattened object of low thickness, irrespective of its contour, format or the material from which it is made. In particular, this could be a full sheet, a pre-cut sheet, a set of cutouts or blanks attached together at points, an individual cutout or blank, a folded box etc. Also, such a flat object may be made of any material and in particular of paper, compact cardboard, corrugated cardboard, plastic material etc.

Similarly, the term "conveyor" designates in general any device capable of conveying a flat object. In particular this could be a roller conveyor, a belt conveyor, a juxtaposition of conveying belts, a conveying band or any combination of these different types of conveyor.

The present invention also concerns a device allowing implementation of the method according to the invention.

BRIEF DESCRIPTION OF THE DRAWINGS

The characteristics which arise from the description below should be considered in isolation or in all possible technical combinations. This description, given as a non-limitative example, is intended to facilitate comprehension of the invention and in particular how it may be implemented. The description is also given with reference to the attached drawings in which:

FIG. 8 illustrates diagrammatically the principle of FIG. 6 in a blank-processing machine; and FIG. 9 illustrates diagrammatically the principle of FIG. 7, i.e. the application of the invention, in a blank-processing machine.

DETAILED PRESENTATION OF PREFERRED EMBODIMENTS

Figure 1:
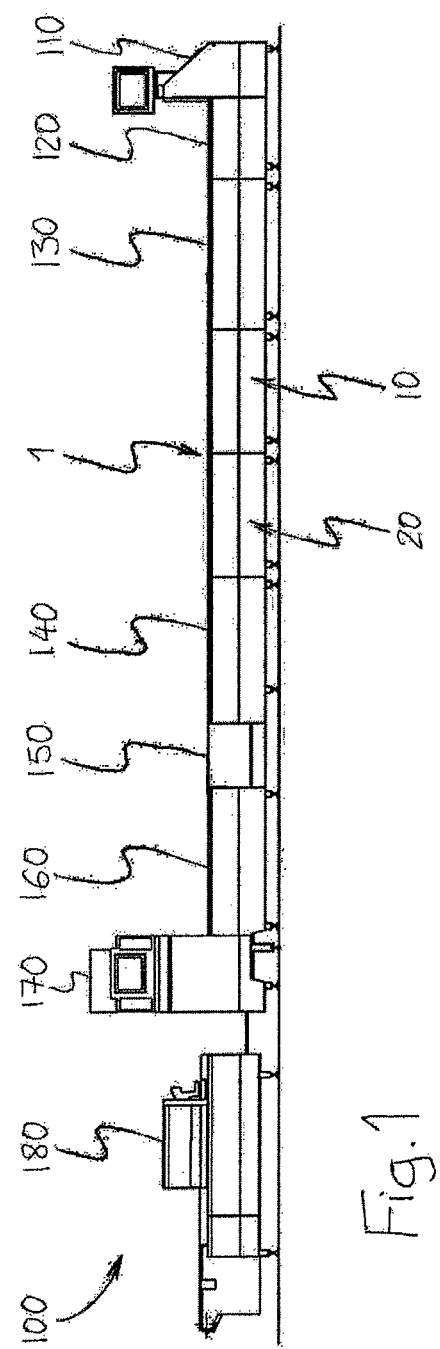
FIG. 1 illustrates a folder-gluer with an integral pivoting unit implementing two pivoting devices as described in the above-mentioned application EP 13001526.6.

FIG. 1 illustrates a folder-gluer 100, the function of which is to fold and glue a succession of flat objects 101 in the form of blanks with a view to the production of folded corrugated cardboard boxes. Having a modular structure, this folder-gluer 100 is conventionally composed of a feeder 110, an alignment module 120, a first folding module 130, a pre-folding module 140, a gluing module 150, a second folding module 160, a transfer module 170 and a receiving module 180. These various elements are well known in the prior art so they will not be described in detail here, either structurally or functionally.

FIG. 1 also shows that the folder-gluer 100 is also fitted with a pivoting unit 1 which is installed between the first folding module 130 and the pre-folding module 140. Positioned here, this pivoting unit 1 is able to rotate flatly each blank 101 while conveying it from the first folding module 130 to the pre-folding module 140.

Figure 2:
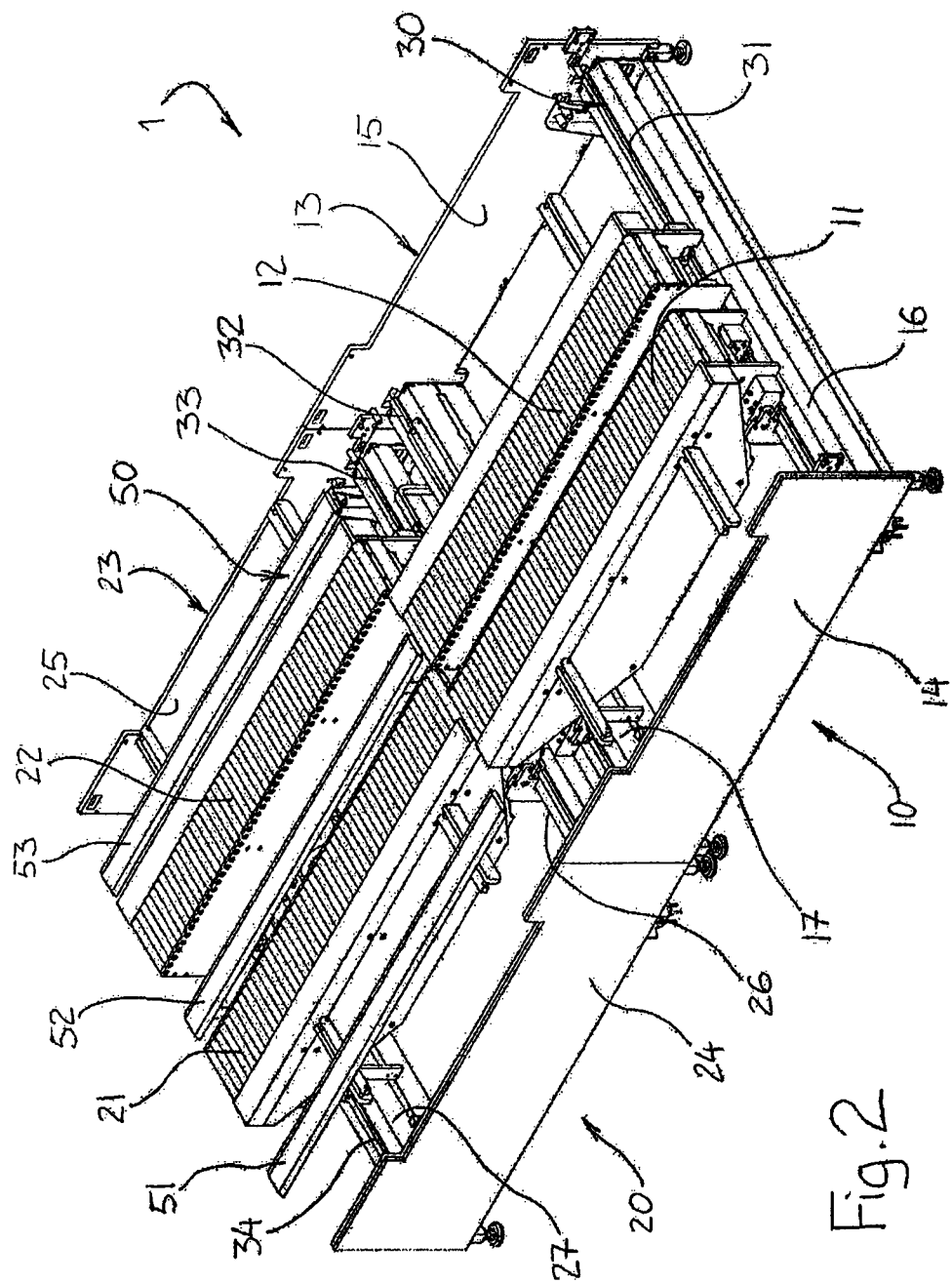
FIG. 2 is a perspective view from above of the pivoting unit shown in FIG. 1.

As it can be seen more clearly on FIG. 2, the pivoting unit 1 is composed of two pivoting devices 10, 20 arranged one after the other in the conveying direction.

The pivoting devices 10, 20 are preferably arranged substantially adjacent. This characteristic means that they are placed one directly after the other, and consequently act immediately successively. This also means that no intermediate device or space is present between the two, which allows optimization of the cumulative action of the two successive pivoting devices 10, 20.

The pivoting unit 1 may also comprise an inlet conveyor placed directly upstream of the successive pivoting devices 10, 20, which is able to convey each blank 101 by supporting it only from below.

The presence of such an inlet conveyor allows each blank 101 to be conveyed without being firmly held, in contrast to a conventional conveyor of a folder-gluer which generally combines a lower conveyor and an upper conveyor on top of this. Here, the inlet conveyor effectively consists of a single lower conveyor on which each blank 101 rests. The absence of an upper conveyor guarantees the blank 101 a certain mobility in its plane. This freedom of movement then advantageously allows the pivoting of the blank 101 to begin very early, i.e. as soon as it arrives on the first conveyors 11, 12.

In this particular embodiment, selected merely as an example, the two pivoting devices 10, 20 constituting the pivoting unit are substantially identical. Each comprises in fact two conveyors 11, 12; 21, 22 which are arranged parallel to each other in order to convey each blank 101 by supporting it jointly, and each pair of the conveyors are able to be driven at different speeds in order to cause each blank 101 to pivot flatly while being conveyed.

Each conveyor 11, 12; 21, 22 may be mounted individually adjustable in the transverse position.

Each conveyor 11, 12; 21, 22 may be mounted movably in transverse displacement. In the present case, each conveyor 11, 12; 21, 22 is not therefore simply mounted movably between some operating positions, but is mounted movably in order to be able to be displaced rapidly and access an infinity of operating positions.

The transverse movability of each conveyor 11, 12; 21, 22 is achieved for example following a linear translation movement. The benefit of this type of movement is that it is particularly easy to guide and generate. This allows a structural simplification of each pivoting device 10, 20 and hence improves its reliability while reducing its cost price.

Each pivoting device 10, 20 is equipped with guidance means 30 which are able to guide the transverse displacement of each conveyor 11, 12; 21, 22.

For each conveyor 11, 12; 21, 22, the guidance means 30 comprise for example at least one transverse guide rail 31, 32; 33, 34 with which the conveyor 11, 12; 21, 22 is able to cooperate by sliding.

Figure 3:
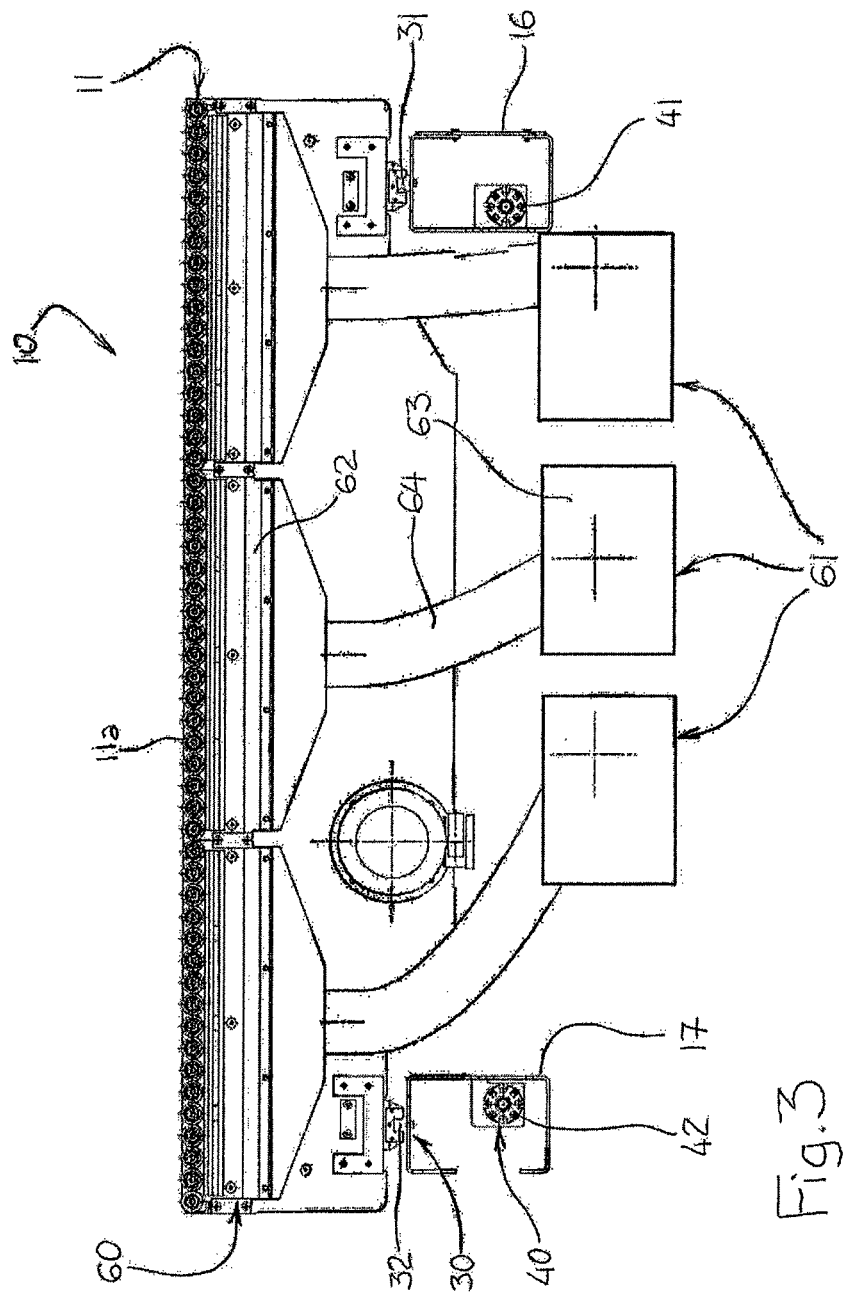
FIG. 3 shows one of the pivoting devices in longitudinal section.
Figure 4:
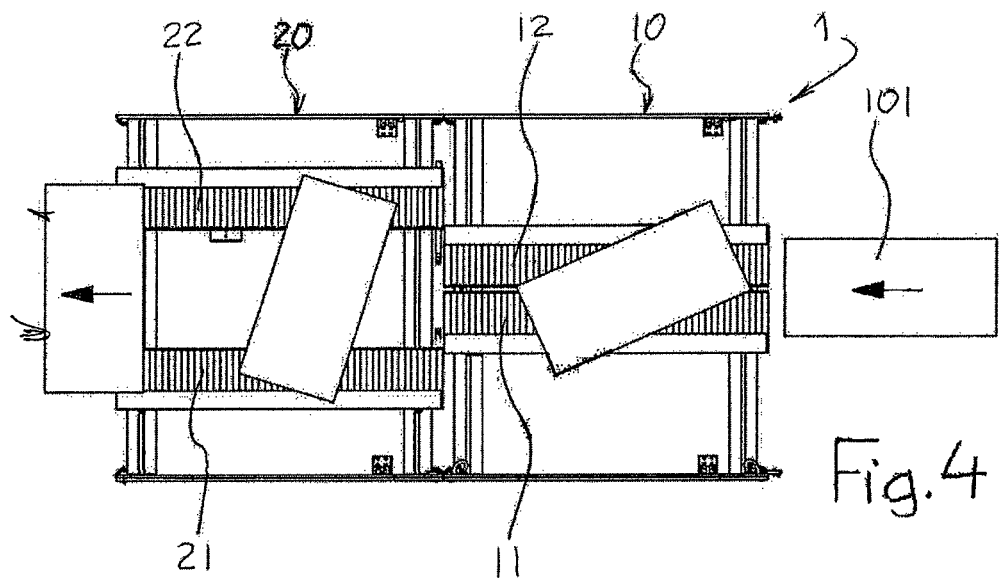
FIG. 4 shows the pivoting unit in a first operating configuration, allowing processing of elongated objects presented in their length direction.
Figure 5:
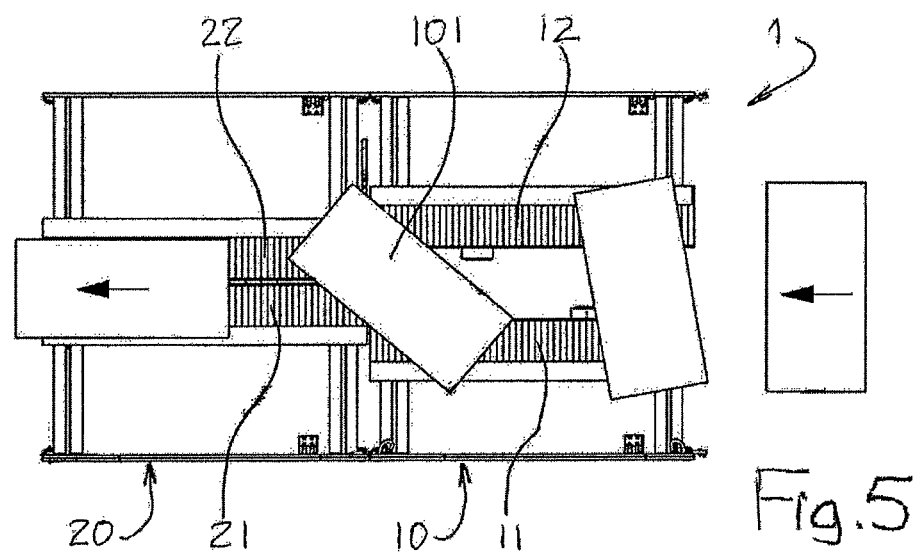
FIG. 5 shows a pivoting unit in a second operating configuration, allowing processing of elongated objects presented in their width direction.

In this exemplary embodiment, and in accordance with FIGS. 2 and 3, each pivoting device 10, 20 rests on a frame 13, 23 which is essentially composed of two vertical side walls 14, 15; 24, 25 connected together by two horizontal cross pieces 16, 17; 26, 27. Each conveyor 11, 12; 21, 22 takes the form of a roller conveyor which extends longitudinally and which is mounted sliding transversely relative to its frame 13, 23 via two transverse guide rails 31, 32, 33, 34 which are fixed respectively to the two cross pieces 16, 17; 26, 27. For evident reasons of simplicity, the two conveyors 11, 12; 21, 22 of each pivoting device 10, 20 cooperate with the same pair of guide rails 31, 32; 33, 34.

Each pivoting device 10, 20 may advantageously be provided with locking means able to block the transverse movability of each conveyor 11, 12; 21, 22. Naturally, said locking means may be of any known type, such as for example a simple blocking screw.

By default, each pivoting device 10, 20 may have drive means 40 which are able to drive each conveyor 11, 12; 21, 22 in transverse displacement. These drive means 40 are primarily intended to control the movement of each conveyor 11, 12; 21, 22 with precision. Here however they also advantageously act as the locking means as defined above. These drive means 40 may also be motorized or manual, depending on the desired degree of sophistication of the pivoting devices 10, 20.

In this exemplary embodiment, the drive means 40 for each conveyor 11, 12; 21, 22 take the form of a conventional transmission system 41, 42 of the endless screw and nut type. The latter will not be described in detail here as it is perfectly known from the prior art. It is noted simply that FIG. 3 shows two transmission systems 41, 42 which are associated with the two conveyors 11, 12 of the pivoting device 10.

The pivoting device comprises support means 50 which are able to support, while allowing it to slip, at least a portion of each blank 101 which is not supported by the conveyors 11, 12; 21, 22.

The support means 50 comprise at least one slide rail 51, 52, 53 which is mounted movably along one of the sides of one of the conveyors 11, 12; 21, 22, and which extends substantially longitudinally in the plane of the conveyor 11, 12; 21, 22.

In this exemplary embodiment, it is noted that only the pivoting device 20 is equipped with such slide rails 51, 52, 53. Two lateral slide rails 51, 53 are shown which are placed respectively at the outer edges of the conveyors 21, 22, and a central slide rail 52 which is positioned along the inner edge of the conveyor 21.

Because the blanks 101 are flat objects of low specific mass, each pivoting device 10, 20 is equipped with flattening means 60 which are intended to flatten each blank 101 against each conveyor 11, 12; 21, 22.

Particularly advantageously, each conveyor 11, 12; 21, 22 cooperates with its own flattening means 60. This feature is intended above all to avoid disrupting the transverse mobility of each conveyor 11, 12; 21, 22. However it also allows selective application and/or differentiated functioning of the different flattening means 60 associated with the different conveyors 11, 12; 21, 22 respectively.

For each conveyor 11, 12; 21, 22, the flattening means 60 are provided with at least one suction element 61 which is able to generate a suction through the conveyor.

FIG. 3 shows that in this exemplary embodiment, each conveyor 11, 12; 21, 22 is associated with three substantially identical suction elements 61. Each suction element 61 is composed of a chamber 62 positioned directly below the rollers 11a of the conveyor 11 and connected to a suction pump 63 via a connecting tube 64.

Figure 6:
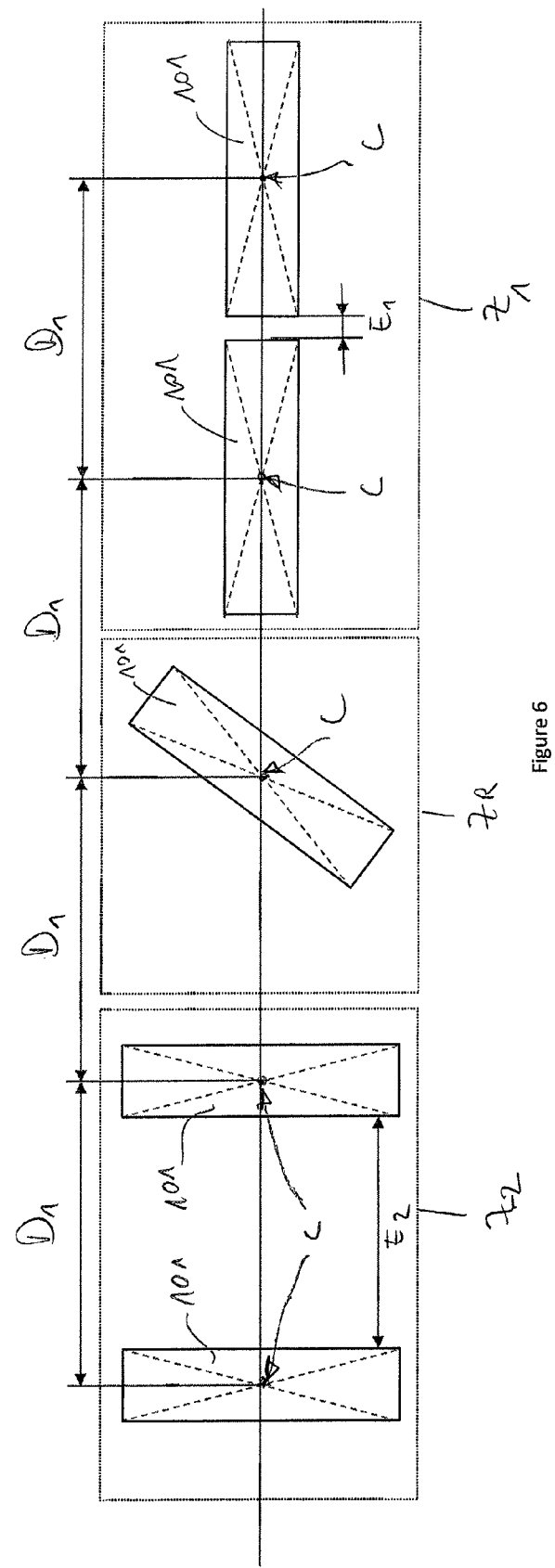
FIG. 6 illustrates diagrammatically the variation in spacing between successive blanks due to the operation of pivoting through 90°, which leads to the loss of productivity according to the technical problem posed in the context of the present invention.

The loss of productivity linked to the method used in the prior art is illustrated in FIG. 6. The blanks 101 move from the right to the left in this figure, passing successively through zone Z1, zone ZR which is the pivoting zone, and zone Z2.

In zone Z1, the successive blanks (only two blanks are shown in the example) follow each other with a distance D1 separating the center of rotation C of each blank 101. Distance D1 is the same in all zones Z1, ZR and Z2, all blanks being conveyed at the same longitudinal speed, here from right to left.

In zone Z1, the blanks are conveyed in the longitudinal direction and the spacing between two successive blanks is E1. When a blank enters the pivoting zone ZR, it undergoes—as known in the prior art and described above—a pivoting through 90° and, once this pivoting is performed, it continues its path through the machine for the following operations, but this time—from zone Z2—arranged in the transverse direction. Since the conveying speed does not change, the spacing between each blank leaving the pivoting zone ZR changes and passes from value E1 to value E2, E2 being greater than E1. The value of E1 and E2 and their relation can easily be calculated:

If L is the length of the blank, and
l is the width of the blank,
it is $$E1 = D1 - 2(L/2) = D1 - L \qquad (1)$$

$$E2 = D1 - 2(l/2) = D1 - l \qquad (2)$$

If L=N×l is assumed, then it is $$D1 = E1 + L = E1 + N \times l \qquad \text{From (1)}$$

$$E2 = E1 + N \times l - l = E1 + (N-1) \times l \qquad \text{From (2)}$$

As it can be seen visually, and as is confirmed by these equations, the spacing between the blanks increases in zone Z2, which causes a loss of productivity downstream in the machine.

According to the invention, the idea is therefore to reduce the conveying speed in zone Z2 relative to the speed prevailing in the preceding zone in the direction of conveying of the blanks 101, in order to create a reduction in spacing between the blanks 101 leaving the pivoting zone ZR.

Figure 7:
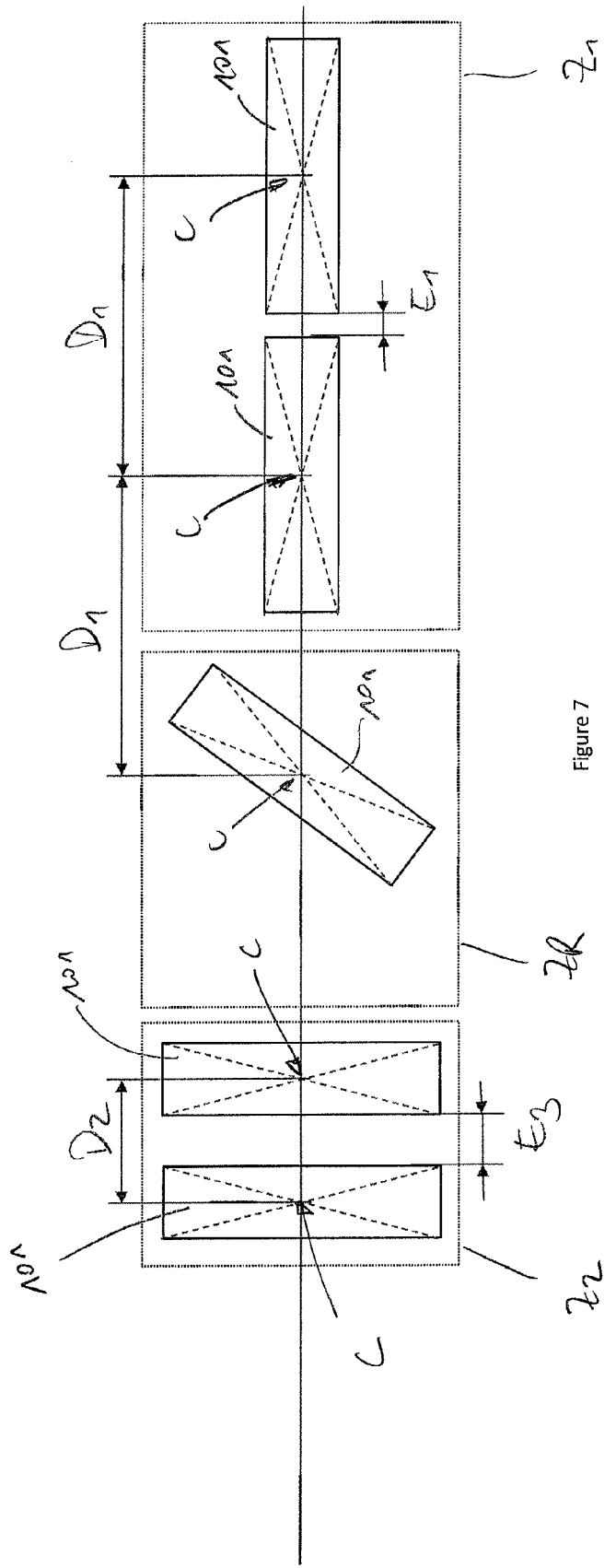
FIG. 7 illustrates diagrammatically the result achieved by the present invention.

The principle of the invention is illustrated in FIG. 7. As in FIG. 6, the blanks 101 are conveyed from zone Z1 into the pivoting zone ZR and then into the next zone Z2, and they undergo the same change in orientation.

According to the present invention, the process is modified by seeking to optimize the conveying speed in zone Z2 to work at optimal efficiency of the machine.

According to one embodiment, this optimal speed in zone Z2 is lower than the conveying speed in the pivoting zone ZR, the effect of which is not to maintain a constant distance D1 between the blanks but to reduce this distance to D2 in zone Z2; this has the effect of reducing proportionally the distance E3 between the blanks 110 in zone Z2. Consequently, the situation illustrated in FIG. 6 is avoided, and the dead space between successive blanks 110 reduced.

The value selected for E3 and obtained from the difference in conveying speeds may also be greater than E1 but less than E2, equal to E1 or even less than E1, this choice being for example a function of the operations applied in the machine downstream of the pivoting zone ZR. The speed difference may therefore be adapted to the desired result.

The examples of FIGS. 6 and 7 may in fact be used in the opposite direction to that taken into account above, the blanks being conveyed from left to right, namely from zone Z2 to zone Z1, passing through the pivoting zone ZR. In such a case, although operation of the configuration in FIG. 6 does not pose the problem of constant conveying speed through the three zones Z2, ZR and Z1, the same does not apply to the configuration of FIG. 7 insofar as the spacing E3 between two blanks 101 is not sufficient to allow the change from the transverse position (zone Z2) to the longitudinal position (zone Z1) without overlap. In such a case, it is of course necessary to impose a speed difference between zone Z2 and zones ZR and Z1, namely an increase in the conveying speed in zone ZR relative to that in zone Z2, in order to avoid this overlap of blanks 101.

FIG. 8 illustrates the principle of FIG. 6 in a machine for processing blanks 101, for example that illustrated in FIG. 1.

The blanks 101 arrive in zone Z1 in longitudinal displacement with spacing E1 between successive blanks 101.

The blanks 101 then move into the pivoting zone ZR where they undergo a rotation through 90°. This pivoting zone comprises for example a pivoting unit 1 as described above, and reference is made to this description.

When the blanks 101 leave the pivoting zone ZR, they enter a following zone Z2 in which the longitudinal conveying speed is equal to that in zones ZR and Z1, such that the spacing between the blanks increases, as shown in FIG. 6 and explained above.

In FIG. 9, in a similar fashion but by applying the principle of the invention, the blanks 101 leaving the pivoting zone ZR enter zone Z2 in which the conveying speed of the blanks 101 is lower according to one embodiment of the invention, such that the spacing between successive blanks is reduced to a value E3 which is less than E2 (FIG. 8).

To allow this speed reduction between zones ZR and Z2, it is preferable to grip fixedly the blanks entering zone Z2, for example with belts between which the blanks are gripped and held and conveyed at the conveying speed of zone Z2. For example, a lower conveyor and an upper conveyor on top of it may be provided, as known from the prior art.

Nonetheless, at the same time, the rear part of the blank which is still being driven in the pivoting zone ZR can slide over conveyors 21, 22, so as to avoid deforming the blank 101, the front part of which is conveyed at a lower speed.

Typically, in the prior art, blanks 101 are flattened onto conveyors 11, 12, 21, 22 by suction. A reduction in the suction force over the final part of zone ZR may then be provided, in order to allow a slipping of the conveyors 21, 22 at the end of travel and to avoid damaging the blank 101 leaving zone ZR and at the same time entering zone Z2.

Once the blank 101 is fully in zone Z2 and at the new reduced speed, it may be conveyed by the usual means of the prior art.

In general, in machines for processing flat objects as described in the present application, a single motor is used to ensure conveying throughout the machine, hence the known operation at a constant conveying speed and the resulting losses of productivity.

To allow functioning with different conveying speeds in successive zones according to the present invention, it is necessary to provide for example a second drive motor which would function at a different speed from the first motor, for example at a lower speed.

Alternatively, a variable transmission may be provided, for example a demultiplication or a reduction gear, which would act on the conveying speed of one zone (for example zone Z2) to allow its operation at an optimal speed. Such a transmission could operate in stages with fixed demultiplication ratios, or with continuous variation which would allow a finer adjustment of the speed difference. Naturally, the choice may be made according to circumstances.

Once the blanks 101 are moving in zone Z2 and the zones "downstream" of this zone at the optimal machine speed, it is profitable from this "new" speed to perform particular operations on the blanks which would not necessarily be possible or easy if the blanks were moving at the highest speed (typically V1).

The invention concerns more generally any machine for processing flat objects such as blanks, for example a folding and gluing machine 100, which uses the conveying method and a conveying device as described in the present application.

The invention claimed is:

1. A method for conveying a succession of objects in a longitudinal direction, comprising conveying the objects in the longitudinal direction;
    pivoting each object while conveying the object at a first longitudinal displacement speed (V1) during the pivoting and in a pivoting zone;
    conveying each object at a second longitudinal displacement speed (V2) in a second zone adjacent along the longitudinal direction to the pivoting zone,
    wherein the second longitudinal displacement speed is different from the first longitudinal displacement speed and lower than the first longitudinal displacement speed, when the second zone follows the pivoting zone in the direction of movement of the objects, so that the objects change from a longitudinal position in the conveying direction to a transverse position, and a spacing between two successive objects is reduced in the second zone; and
    wherein the second longitudinal displacement speed is greater than the first longitudinal displacement speed, when the second zone precedes the pivoting zone in the direction of movement of the objects, so that the objects change from a transverse position in the conveying direction to a longitudinal position, and a spacing between two successive objects is increased in the pivoting zone.

2. The method according to claim 1, wherein the pivoting of the objects takes place over 90°.

3. The method according to claim 1, wherein the objects are flat objects.

4. The method according to claim 1, wherein each object has a longer dimension and has a different shorter dimension than the longer dimension, such that the pivoting in the pivoting zone rotates the object on a pivot and each object is pivoted as the object is conveyed between the pivot zones, so that the pivoting changes the orientation of the object with the longer dimension in the conveying direction or the shorter dimension in the conveying direction.

5. The method according to claim 4, wherein the objects are pivoted to cooperate with the speeds of conveying through the zones to coordinate speeds between successive ones of the objects that the spacings between successive objects are adjusted to a distance that does not waste space in the conveying direction.

6. The method according to claim 4, wherein the pivoting of each object is selected so that in each zone at the respective speed thereof, the objects being conveyed through each zone are at about uniform spacing apart in the conveying direction.

7. The method according to claim 6, wherein the second speed is lower than the first speed;
the second zone follows the pivoting zone in the direction of movement of the flat objects; and
each object is pivoted in the pivoting zone so that the object is oriented with the shorter dimension in the conveying direction.

8. The method according to claim 7, wherein the second speed is greater than the first speed;
the second zone precedes the pivoting zone in the direction of movement of the flat objects; and
the object is pivoted so that the object is oriented with the conveyor dimension in the conveying direction.

9. A method for conveying a succession of objects in a longitudinal direction, comprising:
providing a device for processing and conveying of objects, the device comprising:
at least one pivoting zone for the objects, a first conveying device configured and operable for conveying the objects in a longitudinal direction at a first longitudinal displacement speed (V1) in which the objects are conveyed by the first conveying device at the first longitudinal displacement speed (V1);
a second zone adjacent to the first pivoting zone;
a second conveying device for the objects, the second conveying device being configured to convey the objects through the second zone by the second conveying device at a second longitudinal displacement speed (V2) which is different from the first longitudinal displacement speed (V1),
wherein the first and second conveying devices are configured so that the second longitudinal displacement speed is greater than the first longitudinal displacement speed, the second zone preceding the pivoting zone in the direction of movement of the objects;
the method comprising the steps of:
conveying the objects in the longitudinal direction;
pivoting each object in the pivoting zone while conveying the object at the first longitudinal displacement speed (V1) during the pivoting;
conveying each object at the second longitudinal displacement speed (V2) in the second zone along the longitudinal direction to the pivoting zone,
wherein due to the second longitudinal displacement speed being greater than the first longitudinal displacement speed, and the second zone preceding the pivoting zone in the direction of movement of the objects, the objects change from a transverse position in the conveying direction to a longitudinal position, and a spacing between two successive objects is increased in the pivoting zone.

10. A device for processing and conveying of objects, the device comprising:
at least one pivoting zone for the objects,
a first conveying device for the objects, the first conveying device being configured and operable for conveying the objects through the at least one pivoting zone by the first conveying device at a first longitudinal displacement speed (V1) in which the objects are conveyed by the first conveying device at the first longitudinal displacement speed (V1);
a second zone adjacent to the first pivoting zone;
a second conveying device for the objects, the second conveying device being configured and operable to convey the objects through the second zone by the second conveying device at a second longitudinal displacement speed (V2) in which the objects are conveyed by the second conveying device at the second longitudinal displacement speed (V2), the second longitudinal displacement speed (V2) being different from the first longitudinal displacement speed (V1),
wherein the first and second conveying devices are configured so that the second longitudinal displacement speed is greater than the first longitudinal displacement speed, the second zone preceding the pivoting zone in the direction of movement of the objects so that the objects change from a transverse position in the conveying direction to a longitudinal position, and a spacing between two successive objects is increased in the pivoting zone.

11. The device according to claim 10, wherein the pivoting of the objects in the pivoting zone is a rotation by 90°.

12. The device according to claim 10, wherein the drive of the first conveying device has a drive comprised of a first motor and the drive of the second conveying device has a drive comprised of a second motor.

13. The device according to claim 10, wherein the objects are formed from cardboard, corrugated cardboard, paper or synthetic material.

14. The device according to claim 10, wherein the objects are flat objects.

15. A machine for processing flat objects, comprising at least one device according to claim 10.

* * * * *